United States Patent [19]

Mueller

[11] Patent Number: 4,535,095
[45] Date of Patent: Aug. 13, 1985

[54] POLYPHOSPHAZENE COMPOUNDING PROCESS

[75] Inventor: Warren B. Mueller, Baton Rouge, La.

[73] Assignee: Ethyl Corporation, Richmond, Va.

[21] Appl. No.: 680,183

[22] Filed: Dec. 10, 1984

[51] Int. Cl.$^3$ .............................................. C08J 9/00
[52] U.S. Cl. ........................................ 521/89; 521/93; 521/180; 521/189; 523/351; 528/399; 528/167
[58] Field of Search ................... 521/93, 89, 180, 189; 523/351; 528/167, 399

[56] References Cited

U.S. PATENT DOCUMENTS

| | | | |
|---|---|---|---|
| 3,994,838 | 11/1976 | Thompson et al. | 521/189 |
| 4,026,838 | 5/1977 | Dieck et al. | 521/189 |
| 4,076,658 | 2/1978 | Dieck et al. | 521/189 |
| 4,083,820 | 4/1978 | Dieck et al. | 521/189 |
| 4,092,278 | 5/1978 | Dieck et al. | 521/189 |
| 4,107,108 | 8/1978 | Dieck et al. | 521/85 |
| 4,113,670 | 9/1978 | Dieck et al. | 521/189 |
| 4,124,557 | 11/1978 | Dieck et al. | 521/189 |
| 4,124,567 | 11/1978 | Dieck et al. | 521/189 |
| 4,136,084 | 1/1979 | Dieck et al. | 521/189 |

*Primary Examiner*—Morton Foelak
*Attorney, Agent, or Firm*—Donald L. Johnson; John F. Sieberth; J. D. Odenweller

[57] ABSTRACT

Process for compounding polyphosphazene gum by (a) mixing a composition comprising a curable polyphosphazene gum, filler, plasticizer and other conventional components but without any curing agent to form a non-curing masterbatch, (b) mixing a composition comprising a polyphosphazene gum and an excess amount of curing agent, at least 10 times that required to cure the phosphazene gum in this mixture and optionally containing other conventional components to form a concentrate and (c) blending the non-curing masterbatch from (a) with sufficient concentrate from (b) to provide an amount of curing agent sufficient to cure the entire resultant mixture.

12 Claims, No Drawings

POLYPHOSPHAZENE COMPOUNDING PROCESS

BACKGROUND OF THE INVENTION

Cellular plastics have been available for many years. One of the first of such materials was cellular rubber dating to the 1910–1920 period. Subsequently cellular compositions were made from latex, phenol-formaldehyde resins, urea-formaldehyde resins, PVC, polyurethane, cellulose acetate, polystyrene, polyethylene, epoxies, ABS resins, silicones and very recently polyphosphazenes. Polyphosphazene foams have very desirable properties in that they are highly fire resistant and when subject to direct flame do not produce comparatively large amounts of toxic smoke which is encountered with many other common foamed materials, noteably polyurethanes.

Polyphosphazenes are polymers containing a plurality of

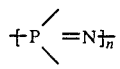

groups wherein substituents are bonded to phosphorus. The polyphosphazenes which are the concern of this invention are high molecular weight linear polyphosphazenes containing 50 or more of the above units and having molecular weights from about 10,000 up to 5,000,000 or higher. They are substantially linear and have little if any cross-linking. In general, they are soluble in benzene, toluene, cyclohexane, and tetrahydrofuran and are relatively insoluble in linear aliphatic hydrocarbons such as hexane or heptane. Groups substituted on phosphorus include phenoxy, alkylphenoxy, alkoxyphenoxy, aminoalkylphenoxy, alkylaminoalkylphenoxy, dialkylaminoalkylphenoxy, halophenoxy (e.g., para-chlorophenoxy, meta-bromophenoxy, trifluorophenoxy and the like), haloalkylphenoxy (e.g., trifluoromethylphenoxy), alkoxy, haloalkoxy (e.g., trifluoroethoxy), nitrophenoxy, alkenylphenoxy (e.g., ortho-allylphenoxy and the like). The polyphosphazenes prior to mixing with other ingredients are referred to as "polyphosphazene gum".

Methods of making cellular polyphosphazenes are known. Various procedures are described in U.S. Pat. Nos. 4,026,838; 4,055,520; 4,055,523; 4,107,108; 4,189,413 and others. In general, the foams are made by mixing the polyphosphazene gum, fillers, a blowing agent and a peroxide or sulfur-type curing agent and heating the blended components to activate the blowing agent and cure the resultant foam. Control of the process to obtain uniform results leaves much to be desired. When the process is conducted in what appears to be the same manner based on mixing time, composition, foaming temperature and curing temperature, different results frequently occur. After making an acceptable foamed product, the next run although conducted with the same composition can give a poor result such as a split in the foam interior.

SUMMARY OF THE INVENTION

It has now been discovered that a polyphosphazene gum can be compounded to form a composition that can be consistently converted to a low density foamed article by separately mixing (a) a non-curing polyphosphazene masterbatch of all or most of the desired components except for the curing agent (e.g. sulfur, accelerator and the like) and (b) a concentrate comprising a polyphosphazene gum and a large, at least 10 fold excess of curing agents and optionally other conventional ingredients and then mixing a small amount of the concentrate with the much larger masterbatch to form a curable masterbatch. When a blowing agent is included in either the non-curing masterbatch or the concentrate or both, the resultant curable masterbatch can be consistently converted to low density, e.g. less than about 5 lbs./cu. ft., foamed articles.

DESCRIPTION OF THE PREFERRED EMBODIMENTS

A preferred embodiment of the invention is a process for making a foamable polyphosphazene composition suitable for consistent conversion to a foamed polyphosphazene article having a density below about 5 pounds per cubic foot, said process comprising
(a) intensively mixing a composition comprising
  (i) a curable high molecular weight substantially linear polyphosphazene gum
  (ii) fillers and
  (iii) blowing agents. and optionally other conventional components but excluding curing agents to form a non-curing masterbatch,
(b) intensively mixing a composition comprising
  (i) a high molecular weight substantially linear polyphosphazene gum and
  (ii) 1 or more curing agents to form a concentrate, the amount of said curing agent in said concentrate being at least 10 times the amount required to cure the polyphosphazene gum in said concentrate and
(c) blending said non-curing masterbatch and said concentrate in a ratio such that the resultant blend contains an effective amount of curing agent to cure all of the polyphosphazene gum in said blend.

High molecular weight linear polyphosphazenes are known polymers. Their preparation is described in the literature and in patents such as U.S. Pat. Nos. 3,515,688; 3,700,629; 3,702,833; 3,838,073; 3,843,596; 3,844,983; 3,853,794; 3,883,451; 3,888,799; 3,888,800; 3,896,058; 3,943,088; 3,948,820; 3,970,533; 3,972,841; 3,994,838; 4,006,125; 4,116,785; 4,123,503; 4,128,710 and 4,129,529.

In general, linear polyphosphazenes consist essentially of

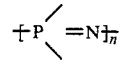

in which n can range from about 50 to 50,000 or more and wherein any of a large number of groups can be substituted on phosphorus. Substituent groups can include alkoxy, substituted alkoxy such as haloalkoxy (e.g. fluoroalkoxy) or alkoxyalkoxy, aryloxy, substituted aryloxy wherein the substituents can be alkyl, alkoxy, halo, alkenyl, haloalkyl, amino, alkylamino, dialkylamino and the like. Other phosphorus substituents can be halogen (e.g. chlorine), alkenoxy, hydroxy and the like.

In making the present composition, the preferred polyphosphazenes are the polyaryloxyphosphazenes. These are polyphosphazenes in which all or most (e.g.

at least 80 percent) of the substituent groups on phosphorus are aryloxy groups. This includes phenoxy groups and substituted phenoxy groups wherein the substituents can be lower alkyl, lower alkenyl, halogen, nitro, amine, alkylamino, dialkylamino, trihalomethyl, acylamido, acyloxy, alkoxy, aryloxy, and the like.

The more preferred aryloxy groups are phenoxy and lower alkylphenoxy. The most preferred aryloxy groups are phenoxy and para-ethylphenoxy and especially mixtures of these two groups.

In developing the present invention, excellent results have been achieved using polyaryloxyphosphazenes in which the substituents were a random mixture of phenoxy, para-ethylphenoxy and ortho-allylphenoxy groups. The ortho-allylphenoxy groups makes the gum capable of sulfur curing or peroxide curing preferred. A preferred ratio is about 25–70 mole percent phenoxy, 25–70 mole percent para-ethylphenoxy and 1–50 mole percent ortho-allylphenoxy.

In making a foam, the polyphosphazene gum is blended with other ingredients to give a compounded polyphosphazene. An essential component of the formulation is a chemical blowing agent. The amount of chemical blowing agent should be that which will evolve sufficient gas to give a foam of the desired density but not an excessive amount which results in splitting of the foam. Chemical blowing agents decompose to evolve gas upon heating. This decomposition temperature varies over a wide range with different foaming agents. Many foaming agents are azo compounds which evolve nitrogen when undergoing thermal decomposition. Examples of blowing agents includes dinitrosopentamethylenetetramine, 4,4′-oxybis(benzenesulfonyl hydrazide), azodicarbonamide, ammonium carbonate, ammonium bicarbonate, sodium bicarbonate, ammonium nitrite, tert-butylamine nitrite, guanidine nitrite, guanlyurea nitrite, sodium borohydride, potassium borohydride, urea, biuret, N-nitro urea, diazoaminobenzene, 2,2′-azobis(2-methylpropionitrile), 2,2′-azobisisobutyronitrile, 1,1′-azobiscyclohexanecarbonitrile, azobisisobutyramidoxime, azobisformamide, N,N′-di-tert-butylazobisformamide, N,N′-diphenylazobisformamide, phenylhydrazine, benzylmonohydrazone, benzenesulfonyl hydrazide, methyl carbanilate, 4,4′-oxybis(benzenesulfonyl hydrazide), 3,3′-sulfonylbis(-benzenesulfonyl hydrazide), cyanuric trihydrazide, 4,4′-oxybis(benzenesulfonyl semi-carbazide), benzoylazide, p-tert-butylbenzoylazide, diphenyl-4,4′-disulfonyldiazide, N,N′-dimethyl-N,N′-dinitroso terephthalamide and the like.

Curing agents encompass a broad range of compounds which serve to promote cross-linking of the polyphosphazene. One class of curing agents is made up of peroxides. The most important curing agent used to make the present foamed compositions are the sulfur-type curing agents generally referred to as vulcanizing agents. A typical sulfur vulcanizing system comprises sulfur, an accelerator and promoters. Zinc oxide is usually included with the sulfur. Other accelerators include zinc dialkyldithiocarbamates (e.g., zinc dimethyldithiocarbamate, zinc dibutyldithiocarbamate and the like). Other useful accelerators are zinc benzothiazylsulfide, N-cyclohexyl-2-benzothiazylsulfenamide, 4,4′-dithiomorpholine, fatty acids in combination with zinc oxide such as stearic acid, zinc fatty acid salts such as zinc stearate, tetraalkylthiuram monosulfide, tetraalkylthiuram disulfide, 2-benzothiazoyl disulfide, zinc benzothiazolyl mercaptide, mercaptobenzothiazole, 2-benzothiazolylsulfenamide, amines, diphenyl guanidine, thiobisamines, dicyclohexyl benzthiazyl sulphenamide, di-ortho-tolyl guanidine, morpholyl benzthiazyl sulphenamide, tetramethyl thiuram monosulphide, zinc mercapto benzthiazole, N-oxydiethylene benzothiazole-2-sulfenamide, bismuth dimethyldithiocarbamate, cadmium diamyldithiocarbamate, copper dimethyldithiocarbamate, lead diamyldithiocarbamate, selenium diethyldithiocarbamate, tellurium diethyldithiocarbamate, zinc diamyldithiocarbamate, dipentamethylene thiuram hexasulfide, zinc isopropyl xanthate, trimethylthiourea and the like.

Another component that is usually included in polymer foam compositions is a filler. They are usually inorganic materials although some organic materials are used. Examples of fillers are clay, talc, mica, asbestos, feldspar, bentonite, wollastonite, fullers earth, pumice, pyrophillite, rottenstone, slate flour, vermicullite, calcium silicate, magnesium silicate, alumina, hydrated alumina, antimony oxide, magnesia, titania, zinc oxide, silica, calcium carbonate, barium carbonate, magnesium carbonate, barium sulfate, calcium sulfate, lime, magnesium hydroxide, carbon black, graphite, metal powders, fibers and whiskers, barium ferrite, magnetite, molybdenum disulfide, processed mineral fiber, glass fibers or flakes, ground glass and the like.

Various processing aids are routinely included in the compounding. These components perform such functions as causing the gum to break down (i.e. peptizing), improving mill release, reducing viscosity, improving filler compatibility and the like. These include adjuvants such as graphite, polyethylene wax, vulcanized vegetable oils, poly-alpha-methylstyrene, naphthenic oil, paraffinic oil, aromatic oil, pine oil, rosin oil, peptizers, silicone oil, glycerized metallic soaps, petroleum oil, fatty acids, filled silicone gum, surfactants, polyalkoxy waxes and the like.

The polyphosphazene formulations which are foamed according to the present invention generally include a plasticizer. These can be liquids which when blended with the polyphosphazene gum and the other components tend to reduce the viscosity of the mass and assist in making a homogenous blend. Useful plasticizers include tricresylphosphate, triphenylphosphate, cresyldiphenylphosphate, butyl octyl phthalate, dibutyl phthalate, dicyclohexyl phthalate, diisodecyl phthalate, di-2-ethylhexyl phthalate, ditridecyl phthalate, isooctylisodecyl phthalate, diisodecyl adipate, di-2-ethylhexyl adipate, octyldecyl adipate, diisobutyl adipate, diisooctyl adipate, di-2-ethylhexyl azelate, diisodecyl azelate, dibutyl maleate, glycerol ricinoleate, isopropyl myristate, isopropyl palmitate, butyl oleate, glycerol trioleate, methyl oleate, 2-ethylhexyl oleate, dibutyl sebacate, di-2-ethylhexyl sebacate, butyl stearate, 2-ethylhexyl stearate, triethyleneglycol dicaprate, ethylene glycol terephthalate polyesters, diethylene glycol dipelargonate, polyethylene glycol 200 dibenzoate, polyethylene glycol 600 dibenzoate, glyceryl triacetylricinoleate, adipic acid glycol polyester 6,000, hydrocarbon oils, alkylated napthalene-phenol condensation polymers and the like.

A very effective plasticizer which has excellent compatibility is an aryloxy-substituted cyclophosphazene or low molecular weight aryloxy-substituted linear phosphazene oligomers. These can be made by substituting cyclic phosphonitrilic chloride trimer or tetramer with aryloxy groups similar to the aryloxy groups present in the high molecular weight polyaryloxyphosphazenes or by substituting low molecular weight linear phosphonitrilic chloride oligomers with the same aryloxy groups.

In conventional formulations, the components in the formulated composition are subjected to intensive mixing or mastication to form a substantially uniform blend. This intensive mixing is conducted in the same type equipment used in compounding rubber prior to vulcanization. Suitable mixing equipment on the laboratory scale is marketed under the trademark "Brabender". Larger mixing equipment is marketed under the "Banbury" trademark. These are heavy duty mixers that crush and masticate the formulation until it forms a homogenous blend. One problem associated with this operation is that it can result in excessive exposure of personnel to toxic and/or possibly carcinogenic chemicals used in such formulations. For example, many of the vulcanization accelerators are very toxic and some are reported as possible carcinogens.

Another problem is that in mixing all components at once, the temperature in the high intensity mixer can be high enough to cause the onset of cure in the mixing operation because of the presence of the curing agents. When this happens, the resultant compounded polyphosphazene will not make a satisfactory foam. In the foaming operation, it will tend to split. In a commercial process it is very desirable that the foaming operation consistently produce an acceptable low density foamed article. Inconsistent foaming results increase costs and lower the production capability.

In the present process, a non-curing masterbatch is made which contains the polyphosphazene gum, all or most of the conventional filler and blowing agents. By "non-curing" is meant that the composition does not contain a curing agent, e.g. sulfur, peroxide and the like, but is otherwise capable of being cured. Other conventional compounding ingredients can also be included in this masterbatch operation such as plasticizers, pigments, processing aids and promoters such as zinc stearate or the combination of zinc oxide and stearic acid which gives equivalent results. All of these types of ingredients need not be present if the resultant foamed article is satisfactory without them. Likewise, other ingredients not listed can be included in the compounded masterbatch. The only essential requirement is that the curing agent is not included in the non-curing masterbatch. When this masterbatch is mixed in a high intensity mixer such as a Banbury mixer, the mixture is not very sensitive to temperature as long as it does not get hot enough to set off any blowing agent that might be present or cause oxidation of unsaturated cure sites. The result is a non-curing masterbatch which is thoroughly mixed and yet substantially non-crosslinked.

A typical non-curing masterbatch will have the following composition:
20–50 weight percent polyaryloxyphosphazene gum
30–65 weight percent inorganic filler
3–15 weight percent blowing agent
0–20 weight percent plasticizer
0–5 weight percent pigment
1–5 weight percent processing aid
0–5 weight percent zinc stearate
0–5 weight percent zinc surfactant.

More preferably the non-curing masterbatch will contain
25–35 weight percent polyaryloxyphosphazene
40–55 weight percent inorganic filler
5–10 weight percent chemical blowing agent
1–5 weight percent plasticizer
0–3 weight percent pigment
1–3 weight percent processing aids
1–3 weight percent zinc stearate.

In a separate operation, a concentrate is made, using milder intensive mixing conditions, from a phosphazene gum and a large excess of curing agent and optionally any other components that are desired. The amount of curing agent in the concentrate should be at least 5 times the normal amount of curing agent for the quantity of polyphosphazene gum in the concentrate. More preferably, the amount of curing agent is at least 10 times the normal concentration and still more preferably at least 15 times the normal concentration. Good results have been obtained using as much as 20 times the normal amount of curing agent in the concentrate. The normal concentration can vary somewhat but in the case of a sulfur-accelerator curing system, a normal amount is about 1–10 parts of sulfur and 0.1–3 parts of accelerator per 100 parts of phosphazene gum so the amount in the concentrate should be at least 5–50 parts of sulfur per 100 parts gum, more preferably about 10–100 parts of sulfur per 100 parts gum and still more preferably about 15–150 parts sulfur per 100 parts gum each together with the recommended amount of vulcanization accelerator for that quantity of sulfur.

By milder intensive mixing of the concentrate is meant a mixing operation with less work input which limits the maximum temperature well below the temperature that could cause the onset of cure. Preferably the maximum temperature in the concentrate mixing operation is about 140° F., more preferably about 130° F. and most preferably about 120° F.

A typical concentrate in which the curing agent is a sulfur-based system is as follows:
10–40 weight percent polyaryloxyphosphazene gum
30–60 weight percent sulfur
10–30 weight percent vulcanization accelerator
0–10 weight percent filler
0–20 weight percent plasticizer
0–10 weight percent zinc stearate
0–5 weight percent processing aids
0–20 weight percent other conventional adjuvants.

A more preferred concentrate contains
20–30 weight percent polyaryloxyphosphazene gum
35–55 weight percent sulfur
15–25 weight percent vulcanization accelerator
1–5 weight percent filler
0–5 weight percent plasticizer
0–5 weight percent zinc stearate
1–3 weight percent processing aids.

Each batch of concentrate will usually be sufficient for blending with about 10–20 non-curing masterbatches of equal weight to provide a final curable masterbatch. Because of the time that the concentrate might be stored it is preferred that it be maintained at a low temperature to prevent any premature cure. A recommended storage temperature is about −10° to +10° C.

Following preparation of the non-curing masterbatch and the concentrate, the two are blended together in a third mixing operation. This can be conducted in a standard Banbury mixer at low speed. The final blending is preferably conducted using a 2-roll mill. The proper amount of concentrate is added to the non-curing masterbatch and this composition is blended by passing it through the 2-roll mill. After each pass, the sheet is folded back on itself and again passed through the mill. This is repeated until a substantially homogenous composition is obtained. This usually requires at least 10 passes through the nip of a 2-roll mill and preferably about 20-50 passes are used.

The amount of concentrate blended with the non-curing masterbatch should be an amount which will provide a resultant blend which contains an effective amount of curing agent. This of course is a function of the amount of curing agent in the concentrate. If the concentrate contains 10 times the amount of curing agent normally required to cure the polyphosphazene gum in the concentrate, then about 1 part by weight concentrate would be blended with about 9 parts by weight non-curing masterbatch. Likewise, if the concentrate contains 20 times the normal amount of curing agent, the final blend would require 1 part by weight concentrate and 19 parts by weight non-curing masterbatch. The amount of curing agent normally required to cure the polyphosphazene gum will depend on the particular gum used and the curing system used. However, the proper amount to effectively cure the gum and the way to determine this amount is well known to those skilled in the science of polymer vulcanization. When using the typical non-curing masterbatch and concentrate formulation set forth above, a good cure can be obtained by blending about 3-10 parts by weight concentrate with 100 parts by weight non-curing masterbatch. With a sulfur-based vulcanization system, the amount of curing agent in the final blend should be about 1-10 parts by weight sulfur and 0.1-3 parts by weight accelerator for each 100 parts by weight polyphosphazene gum and more preferably about 3-8 parts by weight sulfur and 1-3 parts by weight vulcanization accelerator per each 100 parts polyphosphazene gum.

It will be apparent that the practice of this invention will greatly reduce the exposure of personnel to the toxic agents generally used in vulcanization systems. The main hazard with these toxic agents occurs when they are handled as dry powders or pellets. Prior to the present invention, this handling of the vulcanization system in powder or pelletized form occurred with each masterbatch compounding. With the present system it will only be needed to handle the toxic chemicals in dry powder or pellitized form once for every 10 or more masterbatches because the toxic materials are only encountered in making the concentrate. Once in the concentrate, these toxic chemicals are relatively innocuous because they do not form air borne powders. There is only minimal exposure during the addition of the concentrate to the non-curing masterbatch.

The following examples shows the preparation of a concentrate, a non-curing masterbatch and a final curable masterbatch following the process described herein.

PREPARATION OF THE CONCENTRATE

The following ingredients were placed in the mixing chamber of a Brabender mixer:

|  | Parts by weight |
| --- | --- |
| Polyaryloxy phosphazene gum[1] | 100 |
| Hydral 710[2] | 10 |
| Silastic HA2[3] | 10 |
| Vanax 552[4] | 50 |
| Methyl Zimate[5] | 12.5 |
| Butyl Zimate[6] | 12.5 |

-continued

|  | Parts by weight |
| --- | --- |
| Sulfur | 175 |

[1]A linear high molecular weight polyaryloxyphosphazene gum in which the phosphorus substituents are 47.2 mole percent phenoxy, 47.8 mole percent para-ethylphenoxy and 5.0 mole percent ortho-allylphenoxy.
[2]Hydrated alumina (Alcoa trademark)
[3]Silica filled methyl vinyl silicone (Dow Corning trademark)
[4]Piperidinium pentamethylene dithiocarbamate (R. T. Vanderbilt trademark)
[5]Zinc dimethyldithiocarbamate (R. T. Vanderbilt trademark)
[6]Zinc dibutyldithiocarbamate (R. T. Vanderbilt trademark)

The components were then mixed in the Brabender to obtain a substantially homogenous concentrate. The final mixing temperature was about 120° F., the concentrate was removed from the Brabender and further homogenized by 20 passes through a 2-roll mill with folding between each pass. The concentrate sheet was then cut into small pellets (approx. ¼ inch cubes) and the pellets were stored under refrigeration until used.

PREPARATION OF THE NON-CURING MASTERBATCH

In the mixing chamber of a Banbury mixer was placed

|  | Parts by weight |
| --- | --- |
| Polyaryloxyphosphazene gum | 381 |
| Hydral 710 | 712.4 |
| Zinc Stearate | 39 |
| Silastic HA2 | 37.4 |
| Carbowax 3350[1] | 7.9 |
| Celogen AZ 730[2] | 99 |
| Titanium Dioxide[3] | 31 |
| Plasticizer[4] | 39 |
| Water | 1.98 |

[1]Polyethylene oxide wax (Union Carbide trademark)
[2]Azodicarbonamide (Uniroyal trademark)
[3]Pigment grade from Kerr-McGee
[4]Phenoxy-ethylphenoxy-allylphenoxy substituted cyclophosphazene trimer

PREPARATION OF THE CURABLE MASTERBATCH

A 1350 gram portion of the above non-curing masterbatch was fed to a 2-roll mill to form a full loop around one roll. Then while rolling, 71.3 grams of the above concentrate pellets were dropped into the nip of the mill so as to be uniformly distributed throughout the polyaryloxyphosphazene loop. The resultant polyaryloxyphosphazene was spotted by the concentrate pellets since they were of a slightly different color. The sheet was cut from the roll and then passed through the nip of the 2-roll mill 40 times with folding after each pass. After the first 10 passes, the concentrate was visually evenly distributed throughout the masterbatch.

The polyphosphazene curing concentrate can also be used to compound polyphosphazene alloys with other compatible polymers such as ethylene-propylene-diene terpolymers (EPDM), ethylene vinyl acetate (EVA) and the like. In one series of such alloys, mixtures of the polyaryloxyphosphazene gum used in the previous example blended with an EPDM (Nordel 1040 DuPont) in various ratios and the blend substituted on an equal weight basis for the polyaryloxyphosphazene used in the concentrate and in the non-curing masterbatch. In other words with the 80/20 blends a mixture of 80 parts polyaryloxyphosphazene and 20 parts EPDM was substituted for 100 parts polyaryloxyphosphazene used in both the concentrate and non-curing masterbatch. In other respects both formulations, the preparation of the curable masterbatch and the preparation of the foam was the same. The properties of the resultant foam were as follows:

POLYARYLOXYPHOSPHAZENE/EPDM RATIO

|  | 80/20 | 70/30 | 60/40 |
|---|---|---|---|
| Density (pcf) | 4.0 | 4.5 | — |
| Tensile (psi) | 14.6 | 14.8 | — |
| Compression Res. (psi) | 2.0 | 1.9 | — |
| Compression Set (%) | 46 | 45 | 9.0 |
| LOI | 39 | 39 | 37 |
| NBS Smoke |  |  |  |
| (N/F) | 55 | 57 | 67 |
| (F) | 74 | 75 | 94 |

Similar foams were made using blends of polyaryloxyphosphazene with ethylene-vinylacetate copolymer (EVA, 45% vinylacetate). The compounding of the concentrate and the non-curing masterbatch was the same except for substitution of the EVA blend. The preparation of the curable masterbatch and the foam was also the same. The properties of the foams were as follows:

POLYARYLOXYPHOSPHAZENE/EVA RATIO

|  | 80/20 | 70/30 | 60/40 |
|---|---|---|---|
| Density (pcf) | 4.4 | 4.5 | 4.3 |
| Tensile (psi) | 17.1 | 18.3 | 18.0 |
| Compression Res. | 1.9 | 2.1 | 1.9 |
| Compression Set | 39 | 45 | 39 |
| LOI | 40 | 39 | 39 |
| NBS Smoke |  |  |  |
| (N/F) | 49 | 41 | 43 |
| (F) | 63 | 57 | 50 |

From the foregoing it is readily apparent that the present process can be successfully used to compound polyphosphazenes which include other polymers. Preferably the gum will contain at least 50 weight percent polyphosphazene gum and more preferably at least 60 weight percent polyphosphazene gum with the balance of the gum being one or more compatible polymers of copolymers. Likewise in referring to the amount of curing agent in the concentrate being at least 10, 15 or 20 times the normal amount which would be required to cure the concentrate, this refers to the total gum in the concentrate including polyphosphazene gum and any other polymers or copolymers that might optionally be blended with the polyphosphazene gum.

PREPARATION OF FOAM

The final curable masterbatch was cut to obtain 3 rectangular pieces approximately 6.5 mm thick and weighing 23 grams, 140 grams and 762 grams respectively. These pieces were placed in a mold and compression molded at 230° F. for 20 minutes. They were then transferred to a foaming oven at 350° F. The two smaller pieces were held 20 minutes in the foaming oven and the larger piece was held 30 minutes in the foaming oven. All produced good low density foams.

What is claimed is:

1. A process for making a foamable polyphosphazene composition suitable for consistent conversion to a foamed polyphosphazene article having a density below about 5 pounds per cubic foot, said process comprising
   (a) intensively mixing a masterbatch composition comprising
      (i) a curable high molecular weight substantially linear polyphosphazene gum;
      (ii) an inorganic filler;
      (iii) a chemical blowing agent; and
      (iv) processing aid(s) and optionally other conventional masterbatch components but excluding curing agents.
   (b) mixing a concentrate comprising
      (i) a curable high molecular weight substantially linear polyphosphazene gum and
      (ii) 1 or more curing agents to form a concentrate, the amount of said curing agent(s) in said concentrate being at least 10 times the amount required to cure the polyphosphazene gum in said concentrate and
   (c) blending said masterbatch composition and said concentrate in a weight ratio of at least 10:1 and such that the resultant blend contains an effective amount of curing agent sufficient to cure all of the gum in said blend.

2. A process of claim 1 wherein said polyphosphazene gum is a high molecular weight substantially linear aryloxy-substituted polyphosphazene gum.

3. A process of claim 2 wherein said aryloxy-substituted polyphosphazene gum contains both phenoxy substituents and lower alkylphenoxy substituents.

4. A process of claim 3 wherein said aryloxy-substituted polyphosphazene gum contains phenoxy substituents, lower alkylphenoxy substituents and lower alkenylphenoxy substituents.

5. A process of claim 4 wherein said lower alkenylphenoxy substituents are ortho-allylphenoxy substituents.

6. A process of claim 5 wherein said curing agent(s) comprises sulfur.

7. A process of claim 6 said curing agent(s) includes a vulcanization accelerator.

8. A process of claim 7 wherein said lower alkylphenoxy substituent is mainly para-ethylphenoxy.

9. A process of claim 8 wherein the aryloxy substituents are 25-70 mole percent phenoxy, 15-70 mole percent para-ethylphenoxy and 1-50 mole percent ortho-allylphenoxy.

10. A process of claim 2 wherein said masterbatch composition comprises
   20-50 weight percent of said polyaryloxyphosphazene gum
   30-65 weight percent inorganic filler
   3-15 weight percent chemical blowing agent
   0-20 weight percent plasticizer
   0-5 weight percent pigment
   1-5 weight percent processing aids
   0-5 weight percent zinc stearate
   0-5 weight percent surfactant
and said concentrate comprises
   10-40 weight percent of said polyaryloxyphosphazene gum
   30-60 weight percent sulfur
   10-30 weight percent vulcanization accelerator
   0-10 weight percent filler
   0-20 weight percent plasticizer
   0-10 weight percent zinc stearate
   0-5 weight percent processing aids
and the weight ratio of said concentrate to said non-curing masterbatch in step (c) is about 3-10 parts by weight concentrate per each 100 parts by weight of non-curing masterbatch.

11. A process of claim 10 wherein said masterbatch composition comprises 25–35 weight percent of said polyaryloxyphosphazene gum
40–55 weight percent inorganic filler
5–10 weight percent chemical blowing agent
1–5 weight percent plasticizer
0–3 weight percent pigment
1–3 weight percent processing aids
1–3 weight percent zinc stearate and said concentrate comprises 20–30 weight percent of polyaryloxyphosphazene gum
35–55 weight percent sulfur
15–25 weight percent vulcanization accelerator
1–5 weight percent filler
0–5 weight percent plasticizer
0–5 weight percent zinc stearate
1–3 weight percent processing aids.

12. A process of claim 1 comprising (a) intensively mixing a curing agent-free masterbatch composition, said masterbatch composition comprising (i) 20–50 weight percent of a curable high molecular weight substantially linear polyphosphazene gum
  (ii) 30–65 weight percent of an inorganic filler
  (iii) 3–15 weight percent of a chemical blowing agent
  (iv) 0–25 weight percent of a different compatible polymer or copolymer gum
  (v) 0–20 weight percent of a plasticizer and
  (vi) 0–5 weight percent of a pigment (b) intesively mixing a concentrate composition comprising (i) 10–40 weight percent of a curable high molecular weight substantially linear polyphosphazene gum
  (ii) a curing agent in an amount at least 10 times that required to cure the polyphosphazene gum in said concentrate
  (iii) 0–10 weight percent filler
  (iv) 0–20 weight percent plasticizer
  (v) 0–10 weight percent zinc stearate and
  (vi) 0–5 weight percent processing aids and (c) blending said masterbatch composition with said concentrate in a weight ratio of at least 10:1 such that the resultant blend contains an effective amount of curing agent sufficient to cure all of the gum in said blend.

* * * * *